(12) United States Patent
Akbari et al.

(10) Patent No.: US 9,228,584 B2
(45) Date of Patent: Jan. 5, 2016

(54) REINFORCED DIRECTIONAL DRILLING ASSEMBLIES AND METHODS OF FORMING SAME

(75) Inventors: Hossein Akbari, Bristol (GB); Geraint Jones, Gloucestershire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 831 days.

(21) Appl. No.: 13/293,135

(22) Filed: Nov. 10, 2011

(65) Prior Publication Data

US 2013/0118247 A1    May 16, 2013

(51) Int. Cl.
  E21B 4/02    (2006.01)
  F04C 2/107    (2006.01)
  B29L 31/00    (2006.01)

(52) U.S. Cl.
  CPC .............. *F04C 2/1075* (2013.01); *E21B 4/02* (2013.01); *B29L 2031/7496* (2013.01); *F04C 2230/24* (2013.01); *F04C 2230/91* (2013.01); *F04C 2270/80* (2013.01); *F05C 2225/00* (2013.01); *F05C 2253/04* (2013.01); *Y10T 156/10* (2015.01); *Y10T 428/249939* (2015.04)

(58) Field of Classification Search
  CPC .................................................... F04C 2/1075
  USPC ......................................................... 175/107
  See application file for complete search history.

(56) References Cited

U.S. PATENT DOCUMENTS

| 4,211,521 A | 7/1980 | Streicher |
| 6,604,922 B1 | 8/2003 | Hache |
| 7,739,792 B2 | 6/2010 | Lee et al. |
| 8,257,633 B2 | 9/2012 | Sindt et al. |
| 8,337,182 B2 | 12/2012 | Lee et al. |
| 2008/0264593 A1 | 10/2008 | Sindt et al. |
| 2009/0107558 A1 | 4/2009 | Quigley et al. |
| 2009/0152009 A1 | 6/2009 | Slay et al. |
| 2009/0169404 A1 | 7/2009 | Sindt et al. |
| 2011/0116959 A1 | 5/2011 | Akbari et al. |
| 2011/0116960 A1 | 5/2011 | Akbari et al. |
| 2012/0134861 A1 | 5/2012 | Akbari |

FOREIGN PATENT DOCUMENTS

| WO | 2009/085112 | 7/2009 |
| WO | WO 2011058296 A2 * | 5/2011 |

OTHER PUBLICATIONS

International Search Report for the equivalent PCT patent application No. PCT/US2012/064285 issued on Mar. 14, 2013.

* cited by examiner

*Primary Examiner* — Giovanna C Wright
(74) *Attorney, Agent, or Firm* — Kimberly Ballew

(57) ABSTRACT

Reinforced directional drilling assemblies and methods of forming reinforced directional drilling assemblies are provided. Strengthening materials may be incorporated into a resilient layer and/or a polymer-based composite material within a directional drilling assembly to improve the durability and performance of a power section within the directional drilling assembly. Inclusion of strengthening materials within a directional drilling assembly may provide a method to detect the status of a power section and send a signal from downhole upon detecting status of the power section. Inclusion of strengthening materials also may provide a method to collect data about operating conditions, including pressure, temperature, torque, RPM, stress level, shock, vibration, downhole weight on bit, and/or equivalent circulating density to send to the surface or to MWD/LWD systems. The strengthening materials may collect data by themselves or in conjunction with a sensor.

16 Claims, 4 Drawing Sheets

REINFORCED DIRECTIONAL DRILLING ASSEMBLIES AND METHODS OF FORMING SAME

BACKGROUND

Directional drilling involves the intentional deviation or steering of a drill bit to form a wellbore that follows a desired path. That desired path of a directional drilling assembly may be vertical, horizontal, or any angle in between or any combination of the three. The drill bit may be pointed in the direction that one wants to drill, which may be accomplished through use of a permanent or adjustable bend near the drill bit in a downhole steerable mud motor, also referred to as a progressive cavity positive displacement pump connecting the drillstring and the drill bit. Mud motors typically include a power section comprising a rotor and stator and a transmission section. The pressure of drilling fluid, also known as mud, pumped through the drillstring from the surface, creates eccentric motion in the power section of the mud motor that is transmitted by the transmission section as concentric power to the drill bit. By pumping mud through the drillstring to the mud motor, the drill bit turns while the drillstring does not rotate, allowing the drill bit to drill in the direction that it points.

In a mud motor, a rotor generally turns within a stator to generate the power that spins the drill bit in a downhole direction. Mud motors may use different rotor and stator configurations to optimize performance for a directional drilling assembly. Non-metal materials, such as composite materials, and/or resilient materials, such as elastomers, have come to be utilized in the fabrication of components in mud motors. For example, the stator of the mud motor may be formed of a composite material lined with a resilient material, such as an elastomer. However, severe operating and environmental conditions associated with oilfield applications where directional drilling assemblies may be utilized tend to degrade or induce mechanical failure of these materials forming components of mud motors. Further, when a failure occurs in the power section, such a failure often may not be observed until there has already been a structural breakdown in the power section.

SUMMARY

Embodiments of the present disclosure generally provide a reinforced directional drilling assembly that may include at least one component with at least one strengthening material applied to a portion of at least one resilient layer to form at least one reinforced resilient layer, and a reinforced polymer composite that may be adhered to the at least one reinforced portion. At least one polymer also may be solidified on the portion of the at least one resilient layer in several forms including liquid, paste, slurry, powder, and/or granules. The at least one polymer may be solidified on the portion of the at least one resilient layer by using chemical additives, applying ultraviolet radiation, applying electron beams, heating, exposing to part of the microwave spectrum, exposing to the full microwave spectrum, steam curing, curing/solidification, and/or cooling.

The at least one resilient layer may include a fluoroelastomer, hydrogenated nitrile rubber, nitrile rubber, synthetic rubber, synthetic polyisoprene, butyl rubber, halogenated butyl rubber, polybutadiene, nitrile butadiene rubber, carboxylated hydrogenated nitrile butadiene rubber, chloroprene rubber, flurocarbon rubber, perfluoroelastomer and/or natural rubber. The reinforced polymer composite may be an epoxy, a metal-filled epoxy, an inorganic-filled epoxy, a polymer fiber-filled epoxy, a polyimide, a polyether ether ketone, a polyketone, a phenolic resin, and/or a polyphenylene sulfide. The at least one strengthening material may include fibers, cord, carbon, glass, polymeric fibers, Kevlar, nylon, short or long fibers, microfibers, nano fibers, fabrics, sheets, mesh filaments, woven reinforcing cloths, three-dimensional structural fibers, wires, conductive polymers, bi-filament materials, multi-filament materials, and/or fiber optic materials. In an embodiment of the present disclosure, the at least one resilient layer may be selected from hydrogenated nitrile rubber or nitrile rubber, the at least one strengthening material may be fiber cord, and the reinforced polymer composite may be epoxy. The at least one strengthening material and/or the at least one resilient layer may be formed as multiple layers or may be formed in multiple sections.

Embodiments of the present disclosure also generally provide methods of forming a reinforced directional drilling assembly by applying to a component of the assembly at least one strengthening material to a resilient layer to form a reinforced resilient layer, forming a polymer-based composite material having at least one strengthening material, and adhering the reinforced resilient layer to the polymer-based composite material. The resilient layer may be formed by extrusion, coextrusion to form a tube with multi-layers, coextrusion to form a tube with multi-sections, winding, injection molding, compression molding, transfer molding, and/or shaping over a mandrel. The adhering step also may include inserting at least one strengthening material between the reinforced resilient layer and the polymer-based composite material and filling a cavity through casting or injection. Forming a polymer-based composite material may include mixing the polymer-based composite material with the at least one strengthening material. The at least one strengthening material may include fibers, cord, carbon, glass, polymeric fibers, Kevlar, nylon, short or long fibers, microfibers, nano fibers, fabrics, sheets, mesh filaments, woven reinforcing cloths, three-dimensional structural fibers, wires, conductive polymers, bi-filament materials, multi-filament materials, and/or fiber optic materials. The polymer-based composite material may be an epoxy, a metal-filled epoxy, an inorganic-filled epoxy, a polymer fiber-filled epoxy, a polyimide, a polyether ether ketone, a polyketone, a phenolic resin, and/or a polyphenylene sulfide.

Other embodiments of the present disclosure generally provide methods for detecting status of a power section in a directional drilling assembly by providing a mud motor having a stator formed from a resilient layer-lined cartridge, adhering at least one strengthening material having signal indication properties to a surface of the resilient layer-lined cartridge to form a reinforced resilient surface, adhering the reinforced resilient surface to a reinforced polymer-based composite material having signal indication properties, and sending a signal upon detecting in the status of the power section. The method also may include collecting data about the power section using the at least one strengthening material and transmitting the data to one of the following: the surface, a measurement while drilling (MWD) system or a logging while drilling (LWD) system. The data may include at least one of pressure, temperature, torque, RPM, stress level, shock, vibration, downhole weight on bit, and/or equivalent circulating density. The at least one strengthening material may include fibers, cord, carbon, glass, polymeric fibers, Kevlar, nylon, short or long fibers, microfibers, nano fibers, fabrics, sheets, mesh filaments, woven reinforcing cloths, three-dimensional structural fibers, wires, conductive polymers, bi-filament materials, multi-filament materials, and/or fiber optic materials.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure relate to forming a downhole steerable mud motor, also referred to as a progressive cavity positive displacement pump, in which a strengthening material may be used along the axis of the power section and/or from the core to the shell of the power section along a radius to improve the durability and performance of a power section within such a pump or motor. Use of a strengthening material may make the pump or motor more durable and able to withstand prolonged engagement between a rotor and a stator in harsh operating conditions. The longevity of the pump or motor, and accordingly the power section, may be increased as strengthening materials may provide additional mechanical and thermal support. Costs associated with drilling and exploration may be reduced as a result. Embodiments of the present disclosure also relate to methods for data transfer and/or status indication relative to a downhole steerable mud motor. Inclusion of strengthening materials within a downhole steerable mud motor may be used for such data transfer and/or signaling of power section life or status according to embodiments of the present disclosure.

Figure 1:
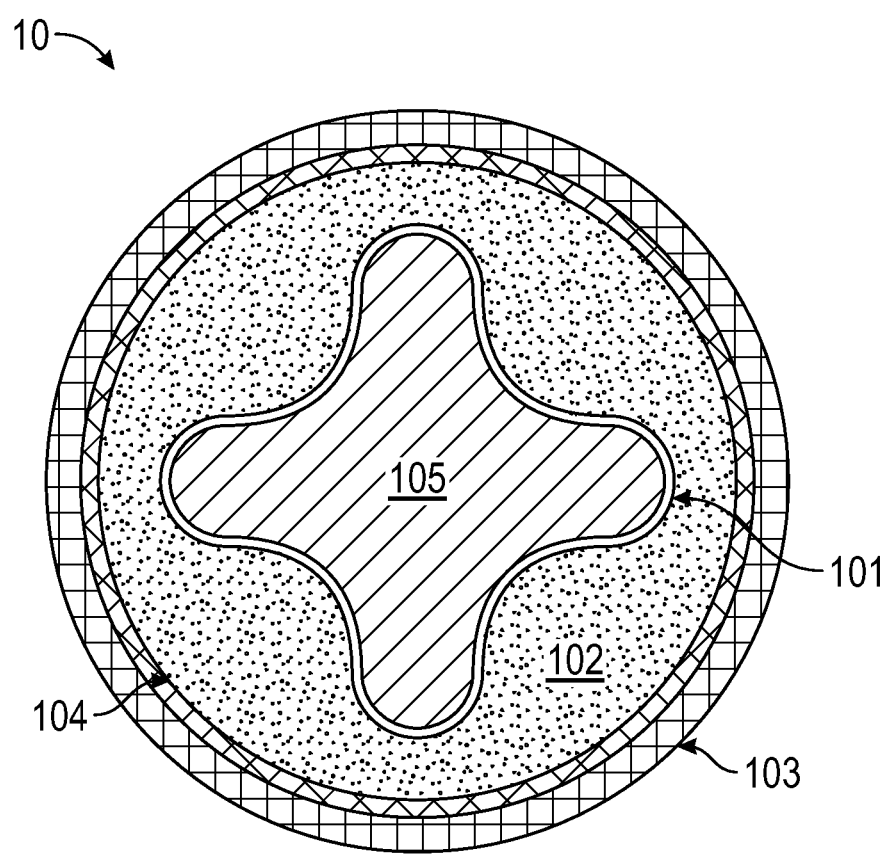
FIG. 1 depicts a cross-sectional end view of a stator forming a portion of a directional drilling assembly according to an embodiment of the present disclosure.

FIG. 1 depicts a cross-sectional end view of stator 10 forming a portion of a directional drilling assembly according to an embodiment of the present disclosure. In an embodiment, stator 10 is used in the power section of a mud motor in a directional drilling assembly. Stator 10 may comprise surface 101 of a resilient layer-lined cartridge adhered to polymer-based composite material 102. Stator tube 103 may be adhered to polymer-based composite material 102 through surface 104 according to embodiments of the present disclosure. Coating 105, such as a fluoro-based coating, a metal coating or a hard coating, may be applied to protect resilient layer 101. It should be appreciated that a surface of a resilient layer-lined cartridge also may be adhered to a polymer-based composite material in a rotor according to embodiments of the present disclosure.

Resilient layers according to embodiments of the present disclosure may include, but are not necessarily limited to, fluoroelastomers (such as VITON fluoroelastomers), hydrogenated nitrile rubber (HNBR), nitrile rubber (NBR), synthetic rubber, synthetic polyisoprene, butyl rubber, halogenated butyl rubber, polybutadiene, nitrile butadiene rubber, carboxylated hydrogenated nitrile butadiene rubber, chloroprene rubber, flurocarbon rubber, perfluoroelastomer and/or natural rubber or combinations thereof. Such resilient layers may be fully cured, partially cured, or green or un-cured, when incorporated into a stator or rotor according to embodiments of the present disclosure. It also should be appreciated that a resilient layer-lined cartridge may be formed from layers of different materials, and may even include a non-resilient layer. In embodiments of the present disclosure, the cartridge may be metallic (e.g., formed from steel, stainless steel, aluminum, titanium, or a combination thereof) and/or coated with metal (e.g., chrome, gold, silver, copper, cadmium, nickel, zinc, lead, tin or a combination thereof).

Resilient layers, such as those formed out of rubber, may be manufactured through several different processes including extrusion, coextrusion to form a tube with multi-layers and/or multi-sections with different compositions, injection molding, compression molding, transfer molding, and/or winding. A resilient layer may be shaped over a mandrel. The resilient layer may be extruded around a mandrel but not cured and then later molded to take shape. A resilient layer may be formed with lobes and a profile shape by molding, pressuring, winding and/or another technique to minimize the stress in the resilient layer and prolong the life of the resilient layer. The resilient layer may be wound around the mandrel and then molded. It should be appreciated that a resilient layer may be wound in shapes other than a round shape similar to a mandrel according to embodiments of the present disclosure. However, a round shape may be used in that it is sometimes less costly to employ and more process-friendly. A resilient layer may be formed over a mandrel, and this may cause the resilient layer to relax, experience less stress and be less likely to fail, thereby improving the life of the stator or rotor. Following extrusion and/or winding, a mold may be provided and pressure may be applied to the mold to improve the mechanical properties of the resilient layer. It should be appreciated that a formed resilient layer or a resilient layer-lined cartridge may be used.

A strengthening material may be applied to a resilient layer so as to reinforce the resilient layer and accordingly improve other properties that may affect the reliability, durability and/or performance of the power section. In embodiments of the present disclosure, a cartridge may be formed having a resilient layer that may be reinforced with a strengthening material. A composite/polymer also may be introduced with respect to a resilient layer for additional reinforcement in a variety of forms, including but not limited to, liquid, paste, slurry, powder, granular form and/or combinations thereof. Such composite/polymer may be solidified with respect to a resilient layer, for example, through use of chemical additives, ultraviolet radiation, electron beams, heating, exposure to either a part of or the full microwave spectrum, steam curing, curing/solidification, cooling, and the like. It should be appreciated that solidifying processes may vary depending on the composite/polymer used. It also should be appreciated that a composite/polymer may be cross-linked according to embodiments of the present disclosure.

Strengthening materials may include, but are not necessarily limited to, fibers, cord, carbon, glass, polymeric fibers (i.e., Kevlar, nylon), short or long fibers, microfibers, nano fibers, fabrics, sheets, mesh filaments, woven reinforcing cloths, conductive polymers, bi-filament materials, multi-filament materials, and/or three-dimensional structural fibers. Strengthening materials also may include wires or fiber optic materials. Strengthening materials may be formed having a certain structure, orientation, shape, dimension and/or architecture according to embodiments of the present disclosure. For example, short fibers may be utilized that may be random having different orientation and may be isotropic according to embodiments of the present disclosure.

Various polymer-based composite materials may be used in forming a stator or rotor for use in a directional drilling assembly according to embodiments of the present disclosure. Such polymer-based composite materials may include, but are not necessarily limited to, epoxy resins, polyimides, polyether ether ketones (PEEK), polyketones, phenolic resins, and/or polyphenylene sulfides (PPS) or combinations thereof. A polymer-based composite material may be adhered to a surface of a resilient layer-lined cartridge and/or to an internal surface of a stator tube according to embodiments of the present disclosure.

Functionalized stators or rotors may be formed out of polymer-based composite materials including strengthening materials. Such stators or rotors may provide fiber structure within the composite structure of the stator and/or rotor. In an embodiment of the present disclosure, strengthening materials may include long or short fiber cords, multiple layers of cord, and/or nylon. One or more of these strengthening materials may be used with a polymer-based composite material, such as epoxy, and a resilient layer, such as HNBR or NBR, according to embodiments of the present disclosure. Strengthening materials having a variety of shapes, forms and dimensions may be added to a casting/injecting polymer-based composite material. A strengthening material may be inserted between the resilient layer and a polymer-based composite material prior to filling a cavity, for example, through casting or injection according to embodiments of the present disclosure. In an embodiment of the present disclosure, a polymer-based composite material, such as epoxy, may be mixed with a strengthening material, such as short fibers. In embodiments of the present disclosure, the strengthening material may be a pre-shaped two-dimensional or three-dimensional structure comprised of micro or nano fibers, filaments and/or woven cloths. A strengthening material may already be present in the polymer-based composite material at the time when an injector may be used to cast the composite material, and such strengthening material may be oriented to be parallel to an axis of the stator. By having such an orientation, this may improve the bending strength of the polymer-based composite material.

It should be appreciated that the polymer-based composite material as well as the resilient layer(s) may both be reinforced. Such reinforcement may be accomplished through various processes, including but not limited to, extrusion and winding. Extrusion may occur by coextruding a fabric cylinder and a resilient layer at the same time wherein the fabric and the resilient layer may be run through a die. In an embodiment of the present disclosure, to create a stator or rotor for use in a mud motor of a directional drilling assembly, a controlled thickness resilient layer may be formed and inserted within a longitudinal bore of a body. For example, a cast material, such as a metal-filled, inorganic-filled, and/or polymer fiber-filled polymer composite, may then be disposed in the void formed between the outer surface of the resilient layer and the longitudinal bore of the body. The cast material may be adhered to the resilient layer. However, methods other than use of cast materials may be utilized according to embodiments of the present disclosure. For example, the manufacturing molding process may involve injection molding, casting molding and/or extrusion according to embodiments of the present disclosure. In an embodiment of the present disclosure, a resilient material may be injected into a void between a stator body and a mandrel. The mandrel may then be removed forming a resilient material-lined stator. In another embodiment of the present disclosure, a resilient material may be extruded through a profile die. In each of these embodiments, strengthening materials may be introduced into the resilient layer as well as the polymer composite.

Embodiments of the present disclosure may provide strengthening materials that may be formed as multiple layers and/or multiple sections. Sections or layers may be formed using different strengthening materials, including but not necessarily limited to, micro fibers, nano fibers, cotton, random fibers, and/or Kevlar. Strengthening materials for use in such layers or sections may be selected, for example, based on mechanical properties and/or costs that may be involved to employ in a stator or rotor. For example, cotton may provide less reinforcement properties within a stator or rotor as compared to micro or nano fibers; however, cotton may be less expensive to employ. Kevlar may have good mechanical properties; however, like micro or nano fibers, Kevlar may be expensive to employ in such rotors or stators in certain embodiments of the present disclosure.

Multi-sectioned strengthening materials may be formed on a resilient layer of a stator or rotor and/or as part of a polymer-based composite material according to embodiments of the present disclosure. In a multi-sectioned strengthening material according to embodiments of the present disclosure, not all of the sections may be formed of the same material having the same mechanical properties. For example, each section may be formed of a different strengthening material having different mechanical properties. In other embodiments of the present disclosure, multi-sectioned strengthening materials may be formed wherein certain sections may have different mechanical properties. It should be appreciated that the polymer-based composite material may differ both radially and axially. For example, the polymer-based composite material itself may differ from one section of the rotor or stator to the next and/or the strengthening material may differ from one section of the rotor or stator to the next. It also should be appreciated that different resilient layers may be used in different sections or layers according to embodiments of the present disclosure.

Figure 2:
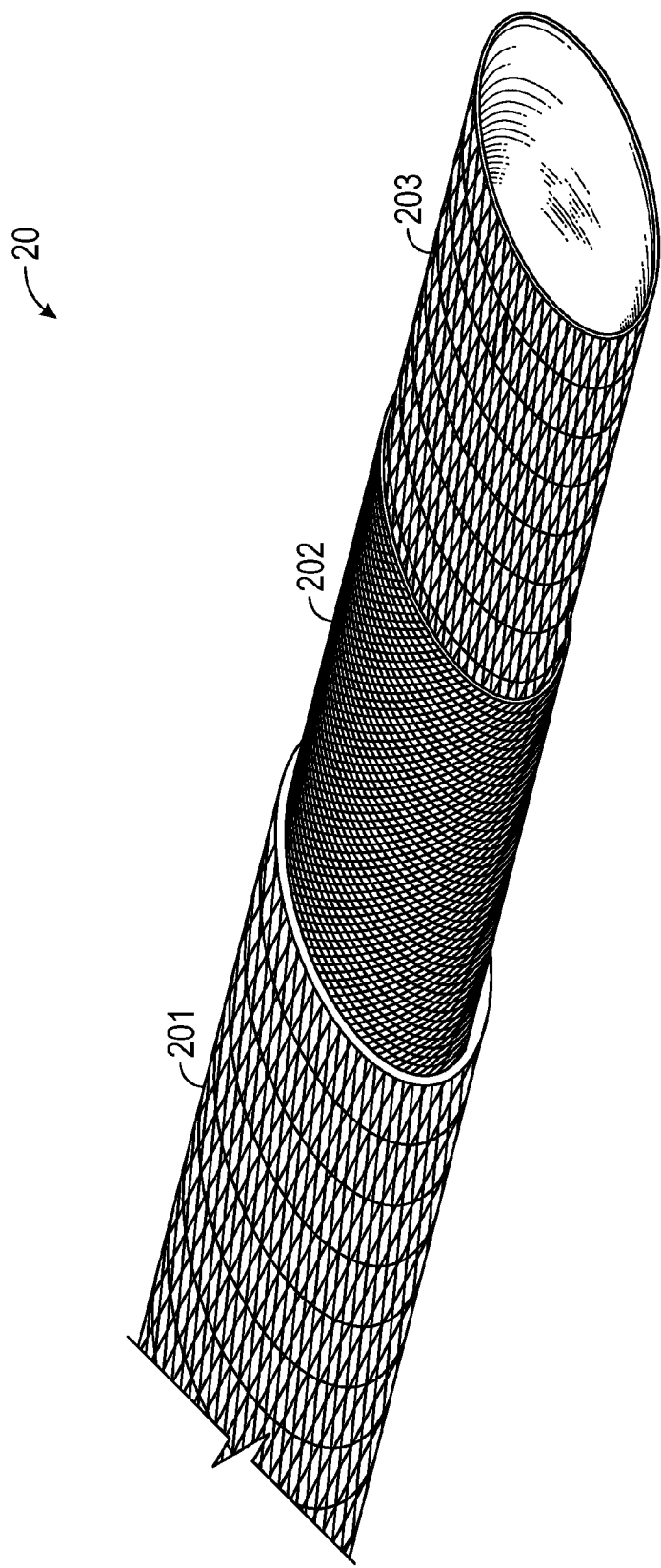
FIG. 2 depicts a schematic perspective view of a multi-sectioned reinforced stator forming a portion of a directional drilling assembly according to an embodiment of the present disclosure.

FIG. 2 depicts a schematic perspective view of multi-sectioned reinforced stator 20 according to an embodiment of the present disclosure. In this embodiment, stator 20 may include three sections—micro/nano fiber section 201, woven materials/wound fiber section 202, and randomly placed short and long fiber section 203. Micro or nano fibers may be utilized in a section of stator 20 as they have good mechanical and strong reinforcement properties; however, they may be selectively used due to their general high cost to employ. Randomly placed short and long fiber section 203 may improve the impact strength of stator 20. Randomly placed short and long fiber section 203 may be used to make the structure of stator 20 more isotropic as compared to section 202 which uses woven or wound fibers. Woven or wound fibers, such as cord, may be used in the middle section 202 of stator 20 as these types of materials may bond well to a polymer-based composite material, such as epoxy, and may respond to bending of stator 20. While stator 20 is depicted in FIG. 2, it should be appreciated that a rotor may be multi-sectioned in a similar manner to stator 20 without departing from the present disclosure. It also should be appreciated that the strengthening material that may be used to form the various sections may be dependent on the stator or rotor properties that may be desired. For example, Kevlar may be employed in a section of a multi-sectioned stator if high temperatures (approximately 400 degrees Celsius) are expected; however, nylon may be used at a lower cost in place of Kevlar if a multi-sectioned stator may be employed at lower temperatures (such as approximately 150 degrees Celsius). Further, it should be appreciated that the same structure/architecture described with respect to FIG. 2 may be used for resilient layer reinforcement and/or polymer-based composite material reinforcement.

A resilient layer may include different strengthening materials that are layered onto the resilient layer to form a multi-layered resilient tube along the axis of a power section according to embodiments of the present disclosure. A multi-layered reinforced resilient layer may be formed through co-extrusion and may include an internal surface that may have abrasion and chemical resistance properties while an outer surface may have adhesion and bonding properties. However, it should be appreciated that a multi-layered reinforced resilient layer may include layers having other mechanical properties without departing from the present disclosure. Multi-layered strengthening materials may be formed on a resilient layer of a stator or rotor and/or as part of a polymer-based composite material according to embodiments of the present disclosure. It should be appreciated that any number of layers and/or arrangements of strengthening materials may be used according to embodiments of the present disclosure. In an embodiment of the present disclosure, a plurality of fiber layers may be applied to a resilient layer to increase stiffness and/or wear resistance of a pump or motor. In another embodiment, different strengthening materials may be used in consecutive layers of a stator or rotor. In a further embodiment of the present disclosure, strengthening materials having similar properties may be used in non-consecutive layers. In other embodiments of the present disclosure, alternating layers of a resilient material, such as an elastomer, and a strengthening material, such as a woven fiber, may be overlaid so as to form a composite structure. In other embodiments, different resilient layers may be used radially and/or axially depending on target mechanical or chemical properties for a rotor or stator. Such fibers may be woven into a mesh, braided and/or overlaid.

Figure 3A:
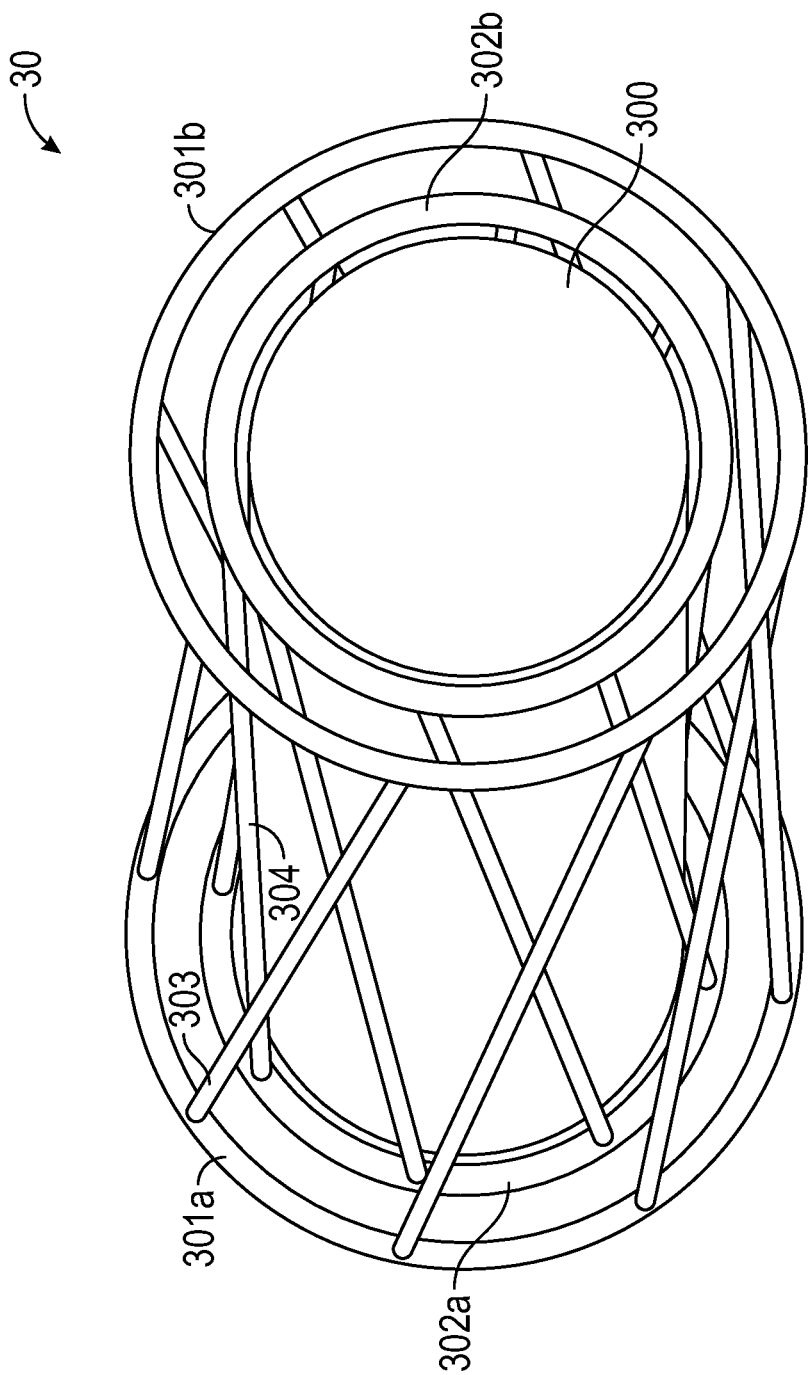
FIGS. 3a and 3b depict schematic perspective views of reinforced stators having ring configurations according to an embodiment of the present disclosure.
Figure 3B:
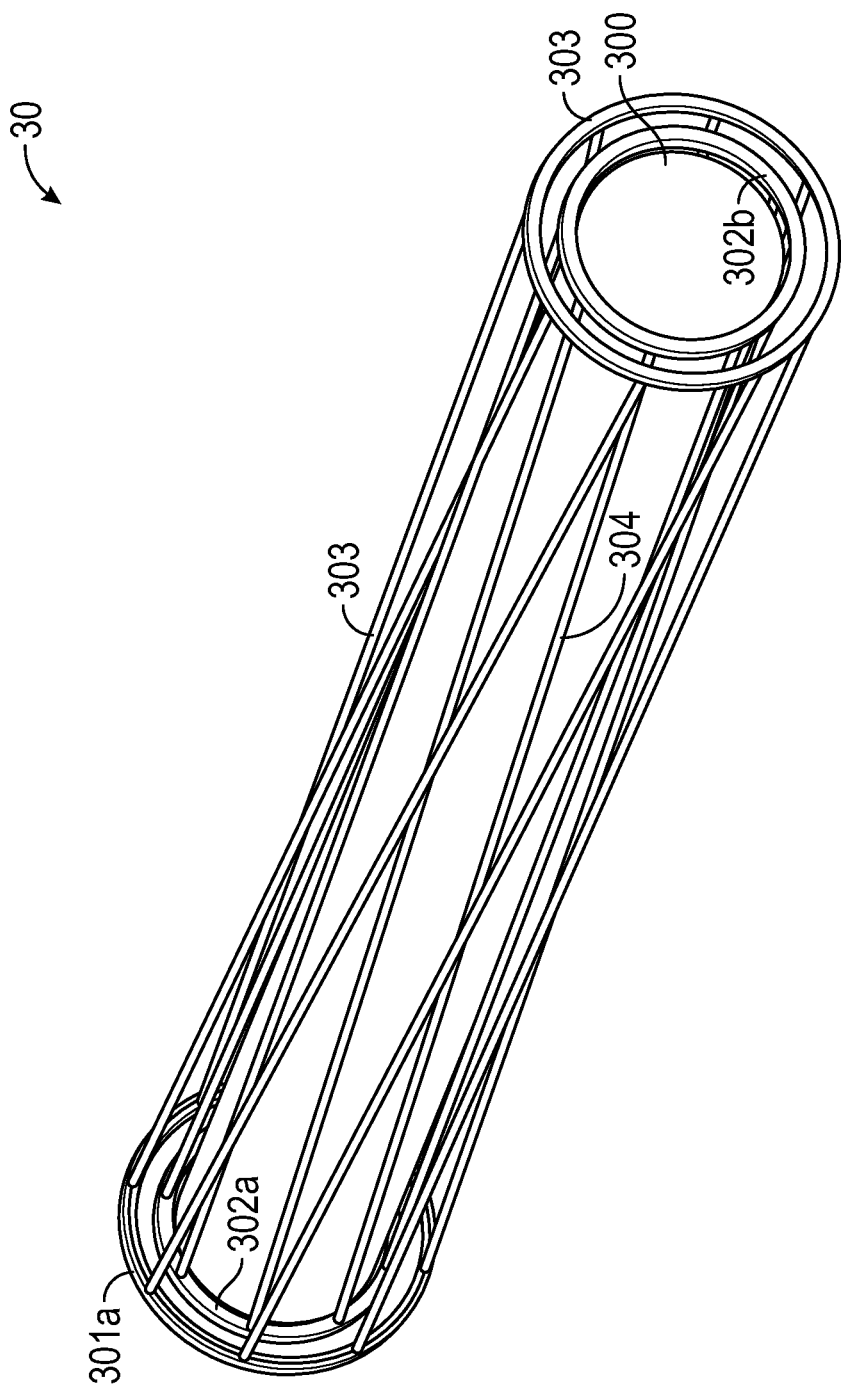

FIGS. 3a and 3b depict schematic perspective views of ring configuration 30 for orienting strengthening materials with respect to a rotor or stator, such as stator 300, in order to improve the strength of the rotor or stator according to embodiments of the present disclosure. In ring configuration 30, a first set of rings 301a, 301b may be positioned on opposite ends of stator 300 and connected with strengthening material 303, 304. A second set of rings 302a, 302b may be concentrically disposed within the first set of rings 301a, 301b similarly positioned on opposite ends of stator 300 and connected with strengthening material 304. In FIG. 3a, first set of rings 301a, 301b and second set of rings 302a, 302b each may be rotated such that strengthening materials 303, 304 may be in a criss-cross pattern with respect to one another. Second set of rings 302a, 302b may be maintained in a stationary position while first set of rings 301a, 301b may be rotated with respect to stator 300 as depicted in FIG. 3b. In an embodiment of the present disclosure, second set of rings 302a, 302b may be rotated counterclockwise such that strengthening material 304 may be oriented at an angle, such as a 30-degree angle, relative to strengthening material 303. Accordingly, strengthening materials 303, 304 may be oriented in a manner so as to further strengthen the rotor or stator to withstand harsh conditions downhole according to embodiments of the present disclosure. It should be appreciated that more than two sets of rings may be utilized in a ring configuration without departing from the present disclosure. For example, as many as ten sets of rings may be utilized according to embodiments of the present disclosure. It also should be appreciated that different types and combinations of strengthening materials may be used in a ring configuration according to embodiments of the present disclosure. For example, a ring configuration may be made using multi-layered or multi-sectioned strengthening materials without departing from the present disclosure.

The power section may be considered an instrument of connection for downhole steerable mud motors. When any damage or failure may occur in a power section, a strengthening material, such as fiber optics or wires or strain gauges, present in a rotor and/or stator in a power section may be used to generate and send a signal from downhole to the surface or to MWD or LWD systems to inform a driller about the status/life of the power section and/or the nature of any damage. A signal may be generated through a sensor on the drill bit that may be sent through the power section to the surface or to MWD or LWD systems. In such embodiments, current discontinuity with respect to such sensors may be interpreted as a sign of failure or damage within the power section. A signal may be generated downhole, such as based on a break in a wire, and when the signal reaches the surface, failures in the power section downhole may be identified. Further, a signal may send other data, including but not limited to, pressure, temperature, torque, RPM, stress level, shock, vibration, downhole weight on bit, and/or equivalent circulating density. This may be achieved by including different sensors embedded in the resilient layer and/or the polymer-based composite material and/or using wires or fiber optics to transfer the data to the surface. It also should be appreciated that the data may be saved, for example, onto a memory card.

Strengthening materials may be used within a power section as a method for data transfer and/or life/status indication according to embodiments of the present disclosure. Such a strengthening material that may be used as a signal indicator may be included as part of a resilient layer of a stator or rotor according to embodiments of the present disclosure. In other embodiments of the present disclosure, a strengthening material having signal indication properties may be incorporated into a polymer-based composite material forming a stator or rotor.

In an embodiment of the present disclosure, a wire or conductive polymer may be used as a strengthening material. However, other strengthening materials may be used without departing from the present disclosure. Wire may be used in certain embodiments of the present disclosure when a conductive polymer may be cost-prohibitive to use. Any type of wire may be used according to embodiments of the present disclosure. In certain embodiments, the polymer-based composite material may have some conductivity to compensate for possibly less conductivity in some wires when compared to use of conductive polymers. Such wire or conductive polymer may be incorporated into a rotor and/or stator and used to gather data about a motor in general and/or a drilling bit located downhole and transmit such data to the surface. Using such a strengthening material may be beneficial in extending the life of a power section in that if the connection is lost or a crack in the stator or rotor occurs, the strengthening material may provide an indication that action should be taken.

While several embodiments of the present disclosure have described reinforcement and status indication with respect to certain types of stators, it should be appreciated that reinforcement and signal indication also may occur with respect to more conventional stator technology. Further, it should be appreciated that reinforcement and status indication as described herein may be employed in a similar with respect to rotors as well as stators in directional drilling assemblies according to embodiments of the present disclosure.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A reinforced drilling assembly comprising:
   at least one component with at least one strengthening material applied to a portion of at least one resilient layer to form at least one reinforced resilient layer, the at least one component having multiple axial sections with strengthening materials differing between at least two of the multiple axial sections; and
   a reinforced polymer composite adhered to the at least one reinforced resilient layer.

2. The reinforced drilling assembly of claim 1, wherein the at least one resilient layer is selected from the group consisting of:
   fluoroelastomer, hydrogenated nitrile rubber, nitrile rubber, synthetic rubber, synthetic polyisoprene, butyl rubber, halogenated butyl rubber, polybutadiene, nitrile butadiene rubber, carboxylated hydrogenated nitrile butadiene rubber, chloroprene rubber, flurocarbon rubber, perfluoroelastomer and natural rubber.

3. The reinforced drilling assembly of claim 1, wherein the reinforced polymer composite is selected from the group consisting of:
   epoxies, metal-filled epoxies, inorganic-filled epoxies, polymer fiber-filled epoxies, polyimides, polyether ether ketones, polyketones, phenolic resins, and polyphenylene sulfides.

4. The reinforced drilling assembly of claim 1, wherein the at least one strengthening material is selected from the group consisting of:
   fibers, cord, carbon, glass, polymeric fibers, Kevlar, nylon, short or long fibers, microfibers, nano fibers, fabrics, sheets, mesh filaments, woven reinforcing cloths, three-dimensional structural fibers, wires, conductive polymers, bi-filament materials, multi-filament materials, and fiber optic materials.

5. The reinforced drilling assembly of claim 1 further comprising:
   at least one polymer solidified on the portion of the at least one resilient layer in one of the following forms:
   liquid, paste, slurry, powder, and granules.

6. The reinforced drilling assembly of claim 5, wherein the at least one polymer is solidified on the portion of the at least one resilient layer using at least one of the following processes:
   using chemical additives, applying ultraviolet radiation, applying electron beams, heating, exposing to part of the microwave spectrum, exposing to the full microwave spectrum, steam curing, curing/solidification, and cooling.

7. The reinforced drilling assembly of claim 1, wherein the at least one resilient layer is selected from hydrogenated nitrile rubber or nitrile rubber, the at least one strengthening material is fiber cord, and the reinforced polymer composite is epoxy.

8. The reinforced directional drilling assembly of claim 1, wherein at least one of the at least one strengthening material and the at least one resilient layer is formed as multiple layers.

9. The reinforced drilling assembly of claim 1, wherein the at least one component is selected from the group consisting of a stator and a rotor.

10. A method of forming a reinforced drilling assembly, the method comprising:
    applying at least one strengthening material to a resilient layer of a component of the assembly to form a reinforced resilient layer, the component having multiple axial sections with strengthening materials differing between at least two of the multiple axial sections;
    forming a polymer-based composite material having at least one strengthening material; and
    adhering the reinforced resilient layer to the polymer-based composite material.

11. The method of claim 10, wherein the resilient layer is formed through one of the following processes:
    extrusion, coextrusion to form a tube with multi-layers, coextrusion to form a tube with multi-sections, winding, injection molding, compression molding, transfer molding, and shaping over a mandrel.

12. The method of claim 10, wherein adhering further comprises:
    inserting at least one strengthening material between the reinforced resilient layer and the polymer-based composite material; and
    filling a cavity through casting.

13. The method of claim 10, wherein adhering further comprises:
    inserting at least one strengthening material between the reinforced resilient layer and the polymer-based composite material; and
    filling a cavity through injection.

14. The method of claim 10, wherein forming a polymer-based composite material comprises:
    mixing the polymer-based composite material with the at least one strengthening material.

15. The method of claim 10, wherein the at least one strengthening material is selected from the group consisting of:
    fibers, cord, carbon, glass, polymeric fibers, Kevlar, nylon, short or long fibers, microfibers, nano fibers, fabrics, sheets, mesh filaments, woven reinforcing cloths, three-dimensional structural fibers, wires, conductive polymers, bi-filament materials, multi-filament materials, and fiber optic materials.

16. The method of claim 10, wherein the polymer-based composite material is selected from the group consisting of:
    epoxies, metal-filled epoxies, inorganic-filled epoxies, polymer fiber-filled epoxies, polyimides, polyether ether ketones, polyketones, phenolic resins, and polyphenylene sulfides.

* * * * *